F. H. YOUNG & G. N. CAMERON.
HEADLIGHT STEERING MECHANISM.
APPLICATION FILED SEPT. 25, 1912.
1,058,835.
Patented Apr. 15, 1913.
2 SHEETS—SHEET 1.
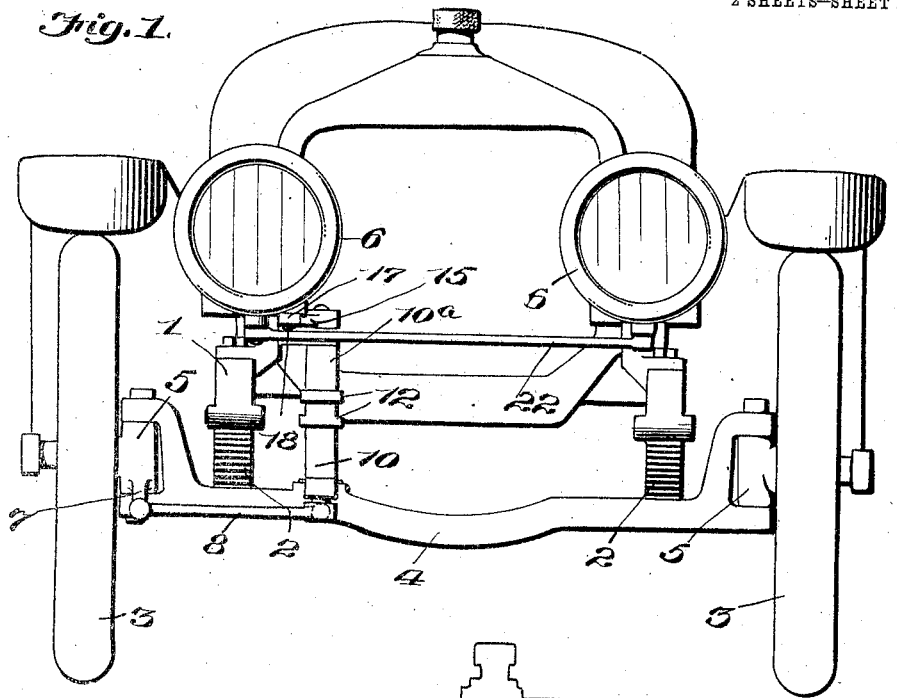
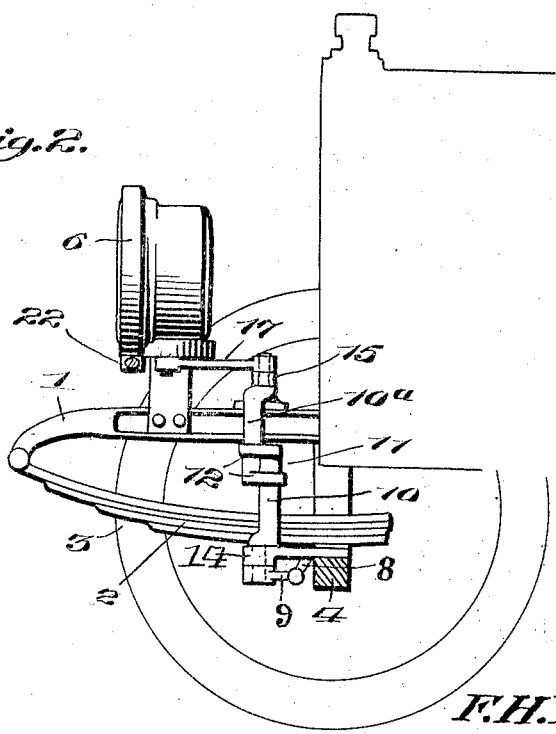

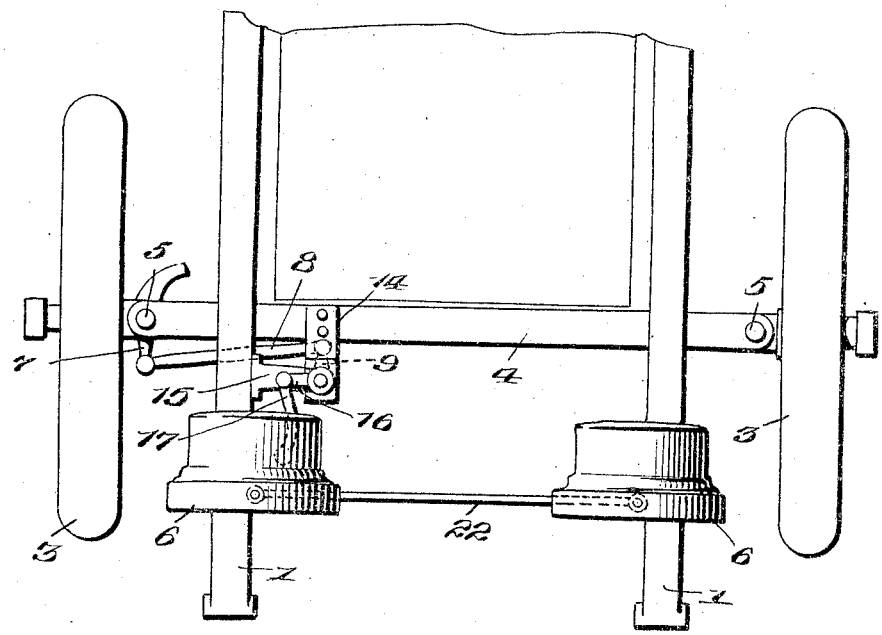
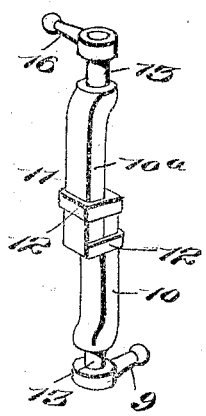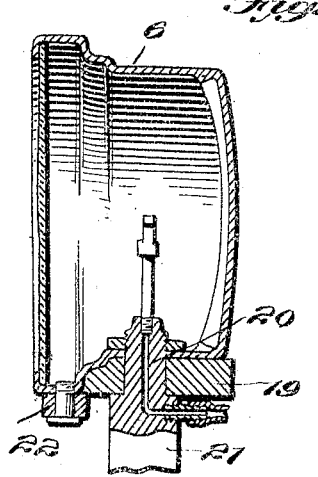

UNITED STATES PATENT OFFICE.

FREDERICK H. YOUNG, OF WILMINGTON, AND GEORGE N. CAMERON, OF MARSHALLTON, DELAWARE.

HEADLIGHT-STEERING MECHANISM.

1,058,835.  Specification of Letters Patent.  Patented Apr. 15, 1913.

Application filed September 25, 1912. Serial No. 722,346.

*To all whom it may concern:*

Be it known that we, FREDERICK H. YOUNG and GEORGE N. CAMERON, citizens of the United States, residing at Wilmington and Marshallton, respectively, in the county of Newcastle and State of Delaware, have invented certain new and useful Improvements in Headlight-Steering Mechanism, of which the following is a specification, reference being had to the accompanying drawings.

To those familiar with the operation of automobiles, it is well known that difficulties are experienced with the ordinary headlights, owing to the fact that they are held in a stationary manner on their supporting posts or pedestals, and consequently, in rounding a curve, the beams of light do not follow the path of the vehicle but are directed at a tangent thereto, and hence do not illuminate the road in advance of the machine.

With a knowledge of these conditions, our invention has for its primary object a simple and efficient mechanism, whereby the headlights of an automobile will be caused to automatically turn with the front or steering wheels to the right or to the left, as the case may be, when the vehicle is rounding a curve, so that the beams of light will at all times be maintained directly in advance of the path of travel and the accidents which frequently happen owing to the lack of illumination on a curve will be thereby avoided.

A further object of the invention is an improved dirigible headlight mechanism, the parts of which may be easily constructed and readily assembled and applied to any conventional type of automobile without material changes or alterations therein.

A still further object of the invention is a mechanism of this character which may be secured to one of the side bars of the vehicle frame at the front thereof and the movements of the front springs compensated for, owing to the fact that one of the connecting elements between one of the headlights and one of the steering wheels is an extensible element, as will be hereinafter more specifically described. And the invention also aims to generally improve devices of this class so as to render them more useful and commercially desirable.

With these and other objects in view, as will more fully appear as the description proceeds, the invention consists in certain constructions, arrangements and combinations of the parts that we shall hereinafter fully describe and claim.

For a full understanding of the invention, reference is to be had to the following description and accompanying drawings, in which, Figure 1 is a front elevation of an automobile equipped with our improved headlight steering mechanism. Fig. 2 is a side elevation thereof partly in section. Fig. 3 is a plan view of the mechanism. Fig. 4 is a detail perspective view of the extensible connecting element hereinbefore referred to, and, Fig. 5 is a section through one of the headlights showing how the same may be mounted for a partly revoluble movement on its supporting post or pedestal.

Corresponding and like parts are referred to in the following description and designated in the accompanying drawings by like reference characters.

Referring to the drawings, the numeral 1 designates the side bars of a frame of an automobile or similar self-propelled vehicle, 2 the front springs thereof, 3 the front or steering wheels mounted upon the ends of the front axle 4 by the knuckle joints 5, and 6 designates the headlights.

In carrying out our invention, one of the knuckles 5 of the front or steering wheels 3 is provided with a forwardly projecting crank arm 7 to which is pivotally connected one end of a link rod 8. The rod 8 extends transversely of the vehicle, as shown, and its other end is pivotally connected to a crank arm 9 which projects horizontally from the lower end of the lowermost section 10 of an extensible connecting element 11. This element includes, in addition to the lower section 10, an upper section 10ª, the two sections, in the present instance, being composed of rectangular bars, as best illustrated in Fig. 4, the ends of said bars overlapping and being slidingly connected together by means of encircling straps 12, whereby the extensions may slide one upon the other and extend or retract the element 11. The element 11 is provided at its lower and upper ends with spindle portions 13 by which it is supported for a turning movement in a lower bracket 14 which is secured in any desired way to the front axle 4 and in an upper bracket 15 secured to the adjoining side bar 1. The uppermost section 10ª of the extensible connecting element 11 is provided with a perpendicularly disposed crank arm 16 which is pivotally connected to one end of a link rod 17, the other end of said rod being pivotally connected by a pin 18 or the like to the base 19 of one of the headlights 6. Each of the two headlights has its base mounted for a revoluble movement on the upwardly projecting boss 20 of the lamp supporting post or pedestal 21, whereby the lamps, with their bases, may be turned, while at the same time, the posts or pedestals themselves remain stationary and may all be suitably provided with passages for the illuminating medium. In order that both of the headlights may turn simultaneously and to the same extent at all times, the headlights are connected by a transverse rod 22, which avoids the necessity of duplicating the extensible element 11 and its correlated parts on both sides of the vehicle.

From the foregoing description in connection with the accompanying drawings, the operation of our improved steering mechanism for automobile headlights will be apparent. When the apparatus is applied to the vehicle, the turning of the front or steering wheels 3 to the right or left will cause the extensible element 11 to turn in its bearings, and consequently, through the instrumentality of the crank arm 16 and link rod 17 and connecting rod 22, both of the lamps will be turned to the right or to the left, as the case may be, and the beams of light will at all times be maintained directly in the path of the machine.

While the accompanying drawings illustrate what we believe to be the preferred embodiment of our invention, it is to be understood that the invention is not limited thereto, but that various changes may be made in the construction, arrangement and proportions of the parts without departing from the scope of the invention, as defined in the appended claims.

What we claim is:—

1. The combination with a spring supporting side frame bar, front axle and a steering wheel of a vehicle, of a vertically disposed extensible connecting element supported for a partially revoluble movement by said frame bar and front axle, respectively, whereby when the spring yields, said element may be shortened correspondingly, said element being provided with upper and lower crank arms, a headlight mounted for a turning movement, and pivotal connections between one of said crank arms and the headlight and between the other crank arm and said steering wheel.

2. The combination with a spring supported side frame bar, front axle and steering wheel of a vehicle, of a headlight mounted for a turning movement, a vertically disposed extensible element consisting of upper and lower sections having overlapping ends and straps connecting said ends together for a sliding movement of one section upon the other, means for supporting said extensible element for a turning movement upon the frame bar and front axle, respectively, said element being provided at its upper and lower ends with crank arms, a connecting rod pivotally connecting the uppermost crank arm to the headlight, and a link rod pivotally connecting the lower crank arm to the steering wheel.

3. In a vehicle of the character described, the combination of headlights mounted for a turning movement, a rod pivotally connected to said headlights to compel them to turn simultaneously and to an equal extent, an extensible connecting element supported by the vehicle underneath the headlights for a partially revoluble movement and provided at its upper and lower ends with crank arms, and link rod connections between the upper crank arm and one of the headlights and between the lower crank arm and one of the steering wheels of the vehicle.

In testimony whereof we hereunto affix our signatures in the presence of two witnesses.

FREDERICK H. YOUNG.
GEORGE N. CAMERON.

Witnesses:
ALBERTUS B. STAYTON,
NELLIE M. KELLEHER.